United States Patent [19]

Krüger et al.

[11] Patent Number: 4,469,408

[45] Date of Patent: Sep. 4, 1984

[54] LIQUID-CRYSTAL DISPLAY HAVING ORIENTING POLYMER WITH FLEXIBLE BRIDGES

[75] Inventors: Hans Krüger, Munich; Roland Rubner, Röttenbach, both of Fed. Rep. of Germany

[73] Assignee: Siemens Aktiengesellschaft, Berlin & Munich, Fed. Rep. of Germany

[21] Appl. No.: 265,628

[22] Filed: May 20, 1981

[30] Foreign Application Priority Data

May 30, 1980 [DE] Fed. Rep. of Germany ....... 3020645

[51] Int. Cl.$^3$ .......................... C09K 3/34; G02F 1/13
[52] U.S. Cl. ............................... 350/340; 252/299.01; 252/299.4; 428/1; 350/339 R
[58] Field of Search ............... 350/346, 347 R, 347 V, 350/347 E, 340, 339 R, 337; 252/299.4

[56] References Cited

U.S. PATENT DOCUMENTS

| | | |
|---|---|---|
| 3,930,716 | 1/1976 | Robert . |
| 4,293,435 | 10/1981 | Portugall .................. 252/299.67 X |
| 4,358,391 | 11/1982 | Finkelmann ............... 252/299.67 X |
| 4,381,886 | 5/1983 | Yokokura .................... 252/299.4 X |
| 4,388,453 | 6/1983 | Finkelmann ................. 252/299.6 X |

FOREIGN PATENT DOCUMENTS

| | | |
|---|---|---|
| 0060335 | 10/1982 | European Pat. Off. ........ 252/299.01 |
| 2548925 | 5/1976 | Fed. Rep. of Germany . |
| 2315541 | 5/1976 | Fed. Rep. of Germany . |
| 2722589 | 11/1978 | Fed. Rep. of Germany . |
| 2831909 | 2/1980 | Fed. Rep. of Germany . |
| 3027571 | 2/1982 | Fed. Rep. of Germany . |
| 0119263 | 9/1979 | Japan ................. 252/299.4 |
| 0133359 | 10/1979 | Japan ................. 252/299.4 |
| 0146120 | 11/1981 | Japan ............... 252/299.01 |
| 1526246 | 9/1978 | United Kingdom . |

OTHER PUBLICATIONS

Konstantinov, "Liquid Crystalline Properties of Some Monomeric Azo- and Azoxybenzenes and Their Polymers", *Journal de Physique*, 7$^e$ Congrés Int'l sur les Cristanx Liquides, pp. C3-475 to C3-477.
Cognard, Supplement 1, Molec. Cryst. and Liq. Cryst., Sections I.1.2, pp. 6-13 and I.4, pp. 23-31, (1982).
Finkelmann, "Behav. of L. C. Side Chain Polymers . . . ", *Mol. Cryst. Liq. Cryst.*, 1983, vol. 94, pp. 343-358.
Applied Physics Letters, vol. 25, No. 1, Jul. 1, 1974,
Makromol. Chem. 180, 803-806, (1979).

*Primary Examiner*—Teddy S. Gron
*Assistant Examiner*—Catherine S. Kilby
*Attorney, Agent, or Firm*—Herbert L. Lerner; Laurence A. Greenberg

[57] ABSTRACT

Liquid crystal display with a liquid crystal layer which can be switched between two optically different states. Two support plates have the surfaces facing each other coated with an electrically conducting layer as well as an orientation layer with at least one orientation layer consisting of a polymer. The plates enclose the liquid-crystal layer. The polymer is liquid-crystalline and can be switched to the off-state and on-state—in the process of which it generates the rest state of the liquid-crystal layer in the off-condition and, in the on-condition, at least enhances the excited state of the liquid-crystal layer.

21 Claims, 2 Drawing Figures

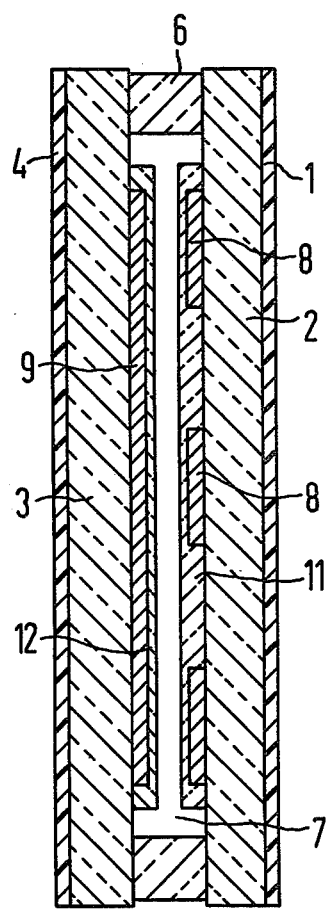
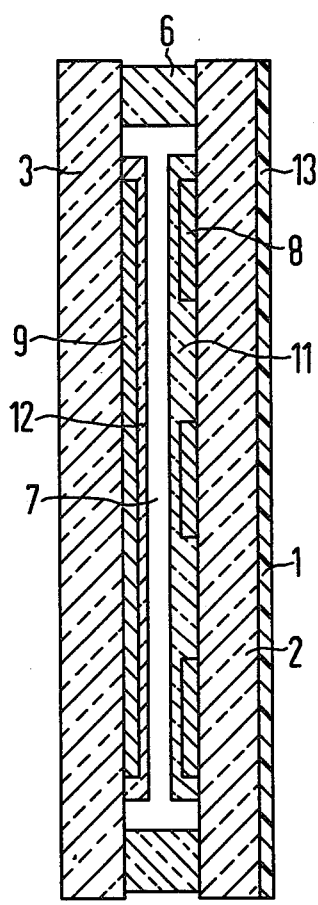

LIQUID-CRYSTAL DISPLAY HAVING ORIENTING POLYMER WITH FLEXIBLE BRIDGES

BACKGROUND OF THE INVENTION

1. Field of the Invention

The invention relates to a liquid-crystal display with a liquid-crystal layer which can be switched between two optically different states (rest state, excited state), and two support plates which enclose the liquid-crystal layer between them and carry on their surfaces facing each other respective electrically conducting coatings (electrodes) as well as an orientation layer, where at least one of the two orientation layers consists of a polymer.

2. Description of the Prior Art

Such a display, in which the polymer layer is rubbed and aligns parallel to the plates, is described in German Published Non-Prosecuted Application No. 25 48 925.

In almost all types of display, the liquid molecules must have a certain orientation in the non-switched state. This rest state texture is generated nowadays as a rule by suitably prepared orientation layers on the carrier plates. A number of techniques have been developed in the meantime by which practically any desired molecule orientation can be brought about and can be held over long periods of operation. In view of this high state of development it is particularly unsatisfactory that it has not been possible to date to suppress the following side effect: An orientation layer which pre-orients the liquid crystal properly has, in general, so high an orientation force that it prevents adjacent liquid crystal molecules from being transferred into the new state or order when the switching voltage is applied. Fringe disturbances remain which degrade the optical qualities (less picture contrast, limited viewing angle range) and limit the number of possible multiplex steps, since the voltage-contrast characteristic is flattened in its transition range. One could, of course, attempt to decrease the texture faults by higher switching voltages. Voltage increases, however, increase the drive requirements and are furthermore possible, with dynamic addressing, only within very narrow limits, since in multiplex operation, the effective on-voltage is interlinked with the effective off-voltage, and both voltages must always bracket the transition region of the voltage-contrast characteristic.

SUMMARY OF THE INVENTION

It is, therefore, an object of the invention to provide a liquid crystal display with a liquid-crystal display orientation means, which, on the one hand, takes care of a clean starting texture and, on the other hand, does not disturb the orientation state of the switched-on liquid crystal.

With the foregoing and other objects in view, there is provided in accordance with the invention a liquid crystal display with a liquid-crystal layer which can be switched between two optically different states of rest state and excited state, and two support plates which enclose the liquid-crystal layer between them and carry on their surfaces facing each other respective electrically conducting coatings as electrodes as well as an orientation layer, where at least one of the two orientation layers consists of polymer, the combination therewith that the polymer layer is liquid-crystalline and can be switched between two different states of off-state and on-state, in the process of which it generates the rest state of the liquid-crystal layer in the off-condition and, in the on-condition, at least enhances the excited state of the liquid-crystal layer.

Other features which are considered as characteristic for the invention are set forth in the appended claims.

Although the invention is illustrated and described herein as embodied in a liquid-crystal display and method for manufacturing same, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which:

FIG. 1 diagrammatically shows a lateral cross section of a liquid crystal display in accordance with the invention with the frame having a front support plate and rear support plate, each coated on the outside with a linear polarizer and coated on the inside with a conductive coating serving as electrodes. The electrodes are coated with a switchable polymer layer in contact with the liquid crystal layer in the frame.

FIG. 2 is a modification of FIG. 1 in that one polarizer layer is omitted. A polymer layer operates in the switched-off state additionally as a polarizer.

DETAILED DESCRIPTION OF THE INVENTION

Liquid-crystal polymers are known per se; see in this connection Makromol. Chem. 180 (1979) Page 803, together with further references. Up to now, these compounds have been considered as advantageous particularly for the reason that they retain the liquid crystal structure during transition into the solid phase ("freezing") and can be processed into layers, foils or fibers without difficulty due to their good deformability (German Published Non-Prosecuted Application No. 27 22 589 and German Published Non-Prosecuted Application No. 28 31 909); no thought had yet been given to their use as a switchable orientation layer. In addition, relatively early had been given to forming a (tilted) homeotropically-oriented layer of solid smectic crystals (German Published Prosecuted Application No. 23 15 541). Such a coating, however, is not a polymerisate and also, incidentally, cannot be switched.

The orientation layer provided by the invention is characterized by the features that its orientation power adapts itself to the switching state of the liquid crystal in such a manner that in the off-condition it acquires the desired texture, like a conventional orientation layer, and, in the on-state, it not only does not impair the new molecule orientation but even enhances it. There is no danger that the polymer layer reacts too sluggishly upon switching and therefore, might not be in a position to execute the described change of state in time. While in the liquid crystal polymers investigated so far, switching times in the range of seconds have been measured, the switching process will be concluded substantially faster in the present case. The reasons for this may be that the orientation layer changes its orientation effect if its orienting components merely flip over, and the parts, which are the mesogenic units which are in direct contact with the liquid crystal molecules, rotate at the layer surface similarly fast as the liquid crystal medium surrounding them.

The polymer contains as a rule main chains to which mesogenic side chains are added via flexible bridges. While the main chains are oriented according to a statistical distribution, the side chains, the orientation of which is not influenced by the position of the main chains, develop a liquid-crystal phase. However, the layer could also be generated by direct polymerization of the flexible bridges provided with the mesogenic units. In any case, the effective layer is extremely thin and may be monomolecular in an extreme case.

It has been found that the tilting angle which the orientation layer imparts on the liquid crystal molecules depends primarily on how densely the mesogenic units are arranged. If they are relatively close together, they protrude perpendicularly into the liquid crystal layer and lead to a (tilted) orientation perpendicular to the plates; if, on the other hand, they are spaced a large distance from each other, they position themselves in the plane of the plates and accordingly bring about a (tilted) homogeneous texture. The liquid crystal molecules which are oriented parallel to the plates are given a uniform preferred direction, if the orientation layer is applied by means of a directional method, for instance an immersion technique or the so-called "Roller-Coating" method.

The polymer layer can be matched to the crystal layer in such manner that it either switches first, or follows the liquid crystal. Embodiment examples in which these two switching variants are particularly advantageous are:

(a) characterized by the feature that first, the liquid-crystal layer (7) and then the polymer layer (11, 12) is reoriented when the switching voltage is applied and/or removed;

(b) characterized by the feature that the polymer layer (11,12) is oriented uniformly parallel to the plates in the off-state and uniformly perpendicular to the plates in the on-state, and that, in the rest condition, the liquid-crystal layer (7) is twisted 90° along the normal to the plates;

(c) characterized by the feature that the polymer layer (11, 12) is oriented perpendicularly to the plates in the off-state and uniformly parallel to the plates in the on-state and that the liquid-crystal layer (7) is twisted 90° along the normal to the plate in the excited state;

(d) characterized by the feature that the polymer layer (11, 12) is oriented uniformly parallel to the plates in the off-state and perpendicular to the plates in the on-state, and that the liquid-crystal layer (7) is oriented cholesterically in the rest condition and homeotropically nematically in the excited state; and (e) characterized by the feature that the polymer layer (11, 12) is oriented uniformly parallel to the plates in the off-state and perpendicular to the plates in the on-state, and that the liquid-crystal layer (7) is oriented cholesterically in the rest condition and homeotropically nematically in the excited state.

Otherwise, a liquid crystal could also be used which does not switch under the influence of the field, but is taken along by the switching polymer layer. In this case, the display needs about the same time interval for switching-on and switching-off which corresponds approximately to the presently customary switching-off times. As compared to conventional display types, the switching-on time is, therefore, less favorable for static drive but becomes attractive in its entirety if multiplexing is applied.

In some circumstances it may make sense to let the polymer layer also operate as a switchable polarizer. In this connection, an embodiment is particularly advisable in which the polymer is linearly polarized in the switched-off state and passes transmitted light in the on-state unattenuated. In many cases the polarizer is needed only in one of the two switching states and acts in the other switching state only as an unnecessarily light- and contrast-attenuating element. A concrete embodiment, in which the advantages of a polymer layer with switchable orientation and polarization power come to bear particularly, is characterized by the feature that one of the two orientation layers is a polymer layer (12) which orients uniformly parallel to the plates in the off-state and orients passing light along the liquid-crystal director and orients it perpendicular to the plates in the on-state, and lets transmitted light pass unattenuated; the the liquid-crystal layer (7) is oriented parallel to the plates in the rest condition with a 90° twist in the direction of the normal to the plates; and that on the side of the liquid-crystal layer facing away from the polymer layer (12), a further polarizer is provided which polarizes in its off-state parallel to the polymer layer (12).

Preferred embodiment examples in conjunction with the attached drawings will now be explained in greater detail. In the drawings, corresponding parts are provided with the same reference symbols. FIG. 1 shows a lateral cross section of a first embodiment example, and FIG. 2, a modified embodiment example in the same type of view.

The Figures are rendered schematically for better clarity. Display parts, which are not absolutely necessary for an understanding of the invention, such as electric leads, are not shown.

The liquid-crystal display of FIG. 1 is a seven-segment numeral display operated in the transmissive mode. In detail, the display contains a front linear polarizer 1, a front support plate 2, a rear support plate 3 as well as a rear linear polarizer 4. The two support plates are connected to each other via a frame 6. The chamber formed by the frame and the two substrates is filled with a liquid-crystal layer 7. The plates 2 and 3 each have on their surfaces facing each other conductive coatings (front electrode of individual drivable segment electrodes 8, continuous rear electrode 9) and thereupon switchable polymer layers 11, 12 which orient the liquid crystal layer 7.

What orientation and switching properties the polymer layers have depends on the electro-optical effect with which the display device operates, and on where the center of gravity of the improvements is to be. The following four examples are singled out as examples from the multitude of possibilities.

EXAMPLE 1

The display is operated as a rotary cell, i.e. the liquid crystal layer is uniformly aligned parallel to the plates in the rest position, with a 90° twist in the direction of the plate normal, and makes a transition into an orientation perpendicular to the plates when the switching voltage is applied. The liquid crystal switched prior to the polymer layer, and both layers are, therefore, coupled soft.

The display device has, above all, higher picture contrast as compared to a conventional rotary cell; it can be read from slant angles and has better multiplex properties.

EXAMPLE 2

The liquid crystal display operates as an inverse rotary cell, in which the liquid crystal molecules are (tilted) homeotropically oriented in the rest position and assume a plate-parallel twisted texture under the influence of an E-field. The polymer layer switches later than the liquid crystal (soft coupling). The same improvements are obtained as in Example 1.

EXAMPLE 3

The display is based on the so-called "phase-change" effect. It has a cholesteric liquid crystal which, in the excited state, is homeotropically nematic. The polymer layer orients in the off-state parallel to the plates and perpendicular in the on-state. It switches more slowly than the liquid crystal layer. As a consequence hysteresis is generated in the voltage-contrast diagram. It is still wider than the hysteresis loop which has been observed for homeotropic edge orientation (Applied Physics Lett. Volume 25 (1974), Page 5). As is well known, such bistability effects permit extremely high multiplexing ratios.

EXAMPLE 4

Same as Example 3, with the difference that the polymer layer switches first and pulls the liquid crystal layer after it. In this case, the orientation layer has the effect that the transition becomes cholesterically homeotropically sharper and takes place at a somewhat lower threshold field.

Also thereby, an improved multiplexing behavior is obtained.

The polymer layer can be used not only, as illustrated by means of the described Examples, in a variety of applications but can also be generated in very different ways. The procedure will, in general, be such that either mesogenic units are interlinked via flexible bridges to a main chain (Alternative 1) or components of the type (flexible bridge/mesogenic unit), via a polymerization of the bridges with each other (Alternative 2). Also copolymerization of the bridges with further olefinically unsaturated compounds is possible. Normally, one may choose to let the polymerization reaction take place only on the substrate or to apply the reaction product to the substrate from a solution.

In Alternative 1, the coupling usually takes place via chemical functions capable of addition or condensation at the parts to be joined together.

Suitable combinations of addition-capable functions are

—OH+—NCO: —NHR(R = H, alkyl)+—NCO;

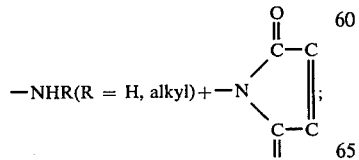

—NCO+—NCO;

—CR=CH$_2$(R = H, alkyl)+—Si—H(R$_1$ = alkyl);
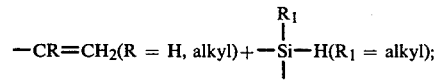

Among the functions capable of condensation can be considered particularly the following combinations, —OH+—COOR(R = H, alkyl); —OH+—COCl;
 —OH+—CONH$_2$; —OH+—SO$_2$Cl —OH+—SO$_2$OR(R = H, alkyl);

—OH+—SiOR$_2$(R$_1$,R$_2$ = alkyl);
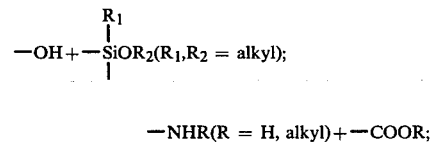

—NHR(R = H, alkyl)+—COOR;

—NHR(R = H, alkyl)+—COCl;
 —NHR(R = H, alkyl)+—CONH$_2$;
  —NHR(R = H, alkyl)+—SO$_2$Cl;

—NHR(R = H, alkyl)+—SO$_2$OR(R = H, alkyl);
 —COOR(R = H, alkyl)+—COOR(R = H, alkyl)

—COOR(R = H, alkyl)+—COCl;
 —COOR(R = H, alkyl)+—CONH$_2$;
  —COOH+—NCO; —COCl+—CONH$_2$;

—CONH$_2$+—CONH$_2$; —SO$_2$Cl+—SO$_2$OR(R = H, alkyl);
 —SO$_2$OR(R = H, alkyl)+—SO$_2$OR(R = H, alkyl).

The flexible bridges consist customarily of alkylene or alkylene ether groups.

Under Alternative 2, the polymerization of the bridges proceeds via polymerizable chemical functions P at the bridge ends in accordance with the following schematic:

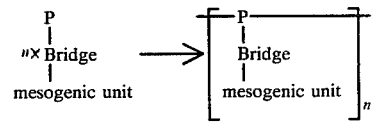

The function P, which is preferably olefinically unsaturated, will, as a rule, have the following composition:

—C(R)=CH$_2$(R = H, alkyl); —O—Si(R)(R)—CH=CH$_2$(R = alkyl);

—CH$_2$—CH=CH$_2$;

—OCH$_2$—CH=CH$_2$; —O—C(=O)—C(R)=CH$_2$(R = H, CH$_3$);

—N(H)—C(=O)—C(R)=CH$_2$(R = H, CH$_3$);

—O—R'—O—C(=O)—C(R)=CH$_2$(R' = alkylene, R = H, CH$_3$);

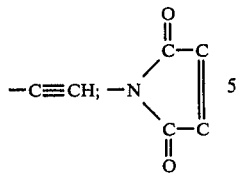

Preparation EXAMPLE 1

4-(methacryloyloxy) ethoxy-4′-methoxybiphenyl is prepared from 4-methoxy-4′hydroxybiphenyl by reaction with ethylenechlorohydrine in aqueous-alcoholic potassium hydroxide solution and subsequent azeotropic esterification with methacrylic acid in chloroform, catalyzed by p-toluol-sulfonic acid. This substance is heated for 8 hours to 65° C. in a benzene solution under nitrogen in the presence of 1 mol percent 2.2-azoisobutylonitrile. The reaction product is dissolved in chloroform and precipitated in a mixture of acetone and methanol. A solution of the liquid-crystal polymer in N-methyl-pyrrolidone is applied via a rubber roller to a glass substrate provided with a conductor structure and dried at 100° C.

Preparation EXAMPLE 2

A solution of 100 g of a polyamidocarboxylic acid ester which was prepared from diaminodiphenyl ether and pyromellithic acid-β-hydroxyethylmethacrylate ester chloride, 100 g 4-(methacryloyloxy) ethoxy-4′-methoxybiphenyl, 4 g Michler's ketone and 10 g N-phenylmaleinimide in N-methylpyrrolidone is applied via a rubber roller on a glass substrate provided with a conductor run structure, is dried at 100° C. and subsequently irradiated with a 400-W mercury very-high-pressure lamp.

Preparation EXAMPLE 3

A solution of 100 g polyamidocarboxylic acid prepared from diaminodiphenyl methane and pyromellithic acid anhydride, 100 g 4-(methacryloyloxy) (ethoxy-4′-methoxy-biphenyl and 1 g 2.2′-azobutyronitrile in N-methylpyrrolidone is applied via a rubber roller to a glass substrate provided with a conductor run structure, is subsequently dried at 100° C. and is finally heated to 250° C.

Preparation EXAMPLE 4

270 g 4-allyloxybenzoic acid-4′-methoxy-phenylester, prepared by reaction of 4-allyloxybenzoic acid chloride with p-methoxy phenol, are dissolved with 55 g of a poly-oxy(methyl-silylene) having a degree of polymerization of 110 in tetrahydrofuran; then, 100 ppm hexachloroplatinic(IV) acid are added as a catalyst. The solution is subsequently kept at 50° C. for 12 hours. The reaction product is precipitated in methanol. A solution with the reaction product is applied by means of a roller to a glass plate provided with a conductor run structure and is subsequently dried.

The display of FIG. 2 deviates from the embodiment example of FIG. 1 in that the polymer layer 12 operates in the switched-off state additionally as a polarizer, and the polarizer 4 is accordingly missing. The polarizer 1, incidentally, could also be omitted if the support plate 2 or the orienting layer 11 is given polarizing properties. The display shown works as a rotary cell with mutually parallel polarizers, where the polymer layer 12 passes the light unattenuated when the switching voltage is applied. Thus, the light must pass only one polarizer in the switched-on state and, thereby, keeps a higher intensity than in the case of a rotary cell of conventional design. (A polarizer never polarizes ideally in practice, so that two polarizers adjusted parallel always absorb more light than a single polarizer).

A polymer layer which polarizes in this manner can be prepared, for instance, if a certain proportion of the mesogenic units is replaced by a suitable dye unit. The so incorporated dyes are taken along when the orienting layer is switched, by the reorienting mesogenic units.

The invention is not limited to the embodiments shown since the application of the switchable orientation layer which optionally acts in addition as switchable polarizer, is of advantage in any display type with pre-oriented liquid-crystal layer. In the applications as well as in the fabrication techniques, great latitude exists and it is merely necessary to see to it that the requirements of the individual case are met. Besides the type and intensity of the orientation as well as the switching behavior, other aspects must be also taken into consideration such as the voltage distribution between the polymer and the liquid crystal in the two switching states, or the mechanical, thermal and electrical properties of the polymer film or the reflection behavior of the layer assembly. Thus, for instance, the voltage contrast characteristic could be made steeper if the orientation layer is given suitably different resistances in its two states. The polymer layer becomes extremely resistant against mechanical influences and thermal stresses if it is mixed from precursor stages of highly heat-resistant polymers and mesogenic compounds which carry polymerizable, addable or condensable groups and optionally also contain initiators, catalysts or sensitizers. The display can also be optically coated internally by mutually matched layer thicknesses; the polymer layer thicknesses required for this purpose are entirely still in the range which must be observed because of the otherwise required polymer properties.

There are claimed:

1. Liquid crystal display with
   I. a liquid-crystal layer switchable between two optically different states of a rest state in which the liquid-crystal layer is in a first orientation state and an excited state in which the liquid-crystal layer is in a second optically different orientation state, and
   II. two support plates which
      (a) enclose the liquid-crystal layer between them, and
      (b) carry on their surfaces facing each other respective electrically conducting coatings as electrodes as well as
      (c) an orientation layer which faces the liquid-crystal layer, where
      (d) at least one of the two orientation layers consists of polymer, the combination therewith that
      (e) the polymer layer is liquid-crystalline and
      (f) is switchable between two different states of off-state and on-state,
      (g) in the process of which it generates the rest state of the liquid-crystal layer in the off-condition and, in the on-condition, at least enhances the excited state of the liquid-crystal layer.

2. Liquid-crystal display according to claim 1, wherein first, the liquid-crystal layer and then the polymer layer is reoriented when the switching voltage is applied.

3. Liquid-crystal display according to claim 1, wherein in electrically switching the liquid-crystal layer, first, the liquid-crystal layer and then the polymer layer is reoriented when the switching voltage is removed.

4. Liquid-crystal display according to claim 1, wherein first, the liquid-crystal layer and then the polymer layer is reoriented when the switching voltage is applied and removed.

5. Liquid-crystal display according to claim 2 or claim 3 or claim 4 wherein the polymer layer orients the liquid-crystal layer uniformly parallel to the plates in the off-state and uniformly perpendicular to the plates in the on-state, and wherein in the rest condition the liquid-crystal layer is twisted 90° along the normal to the plates.

6. Liquid-crystal display according to claim 2 or claim 3 or claim 4, wherein the polymer layer orients the liquid-crystal layer perpendicularly to the plates in the off-state and uniformly parallel to the plates in the on-state and wherein in the excited state the liquid-crystal layer is twisted 90° along the normal to the plate.

7. Liquid-crystal display according to claim 2 or claim 3 or claim 4 wherein the polymer layer orients the liquid-crystal layer uniformly parallel to the plates in the off-state and perpendicular to the plates in the on-state, and wherein the liquid-crystal layer is oriented cholesterically in the rest condition and homeotropically nematically in the excited state.

8. Liquid-crystal display according to claim 1, wherein in electrically switching the liquid-crystal layer, first, the polymer layer is reoriented and, subsequently, the liquid-crystal layer when the switching voltage is applied.

9. Liquid-crystal display according to claim 1, wherein in electrically switching the liquid-crystal layer, first, the polymer layer is reoriented and, subsequently, the liquid-crystal layer when the switching voltage is removed.

10. Liquid-crystal display according to claim 1, wherein in electrically switching the liquid-crystal layer, first, the polymer layer is reoriented and, subsequently, the liquid-crystal layer when the switching voltage is applied and removed.

11. Liquid-crystal display according to claim 8 or claim 9 or claim 10, wherein the polymer layer is oriented uniformly parallel to the plates in the off-state and perpendicular to the plates in the on-state, and wherein the liquid-crystal layer is oriented cholesterically in the rest condition and homeotropically nematically in the excited state.

12. Liquid-crystal display according to claim 1, wherein the liquid-crystal layer is switched into its two switching states exclusively by the switching polymer layer.

13. Liquid-crystal display according to claim 1, wherein the polymer layer polarizes passing light in at least one of its two switching states.

14. Liquid-crystal display according to claim 13, wherein one of the two orientation layers is a polymer layer which polarizes passing light along the liquid-crystal director and orients the liquid-crystal layer perpendicular to the plates in the off-state, and lets transmitted light pass unattenuated and orients the liquid-crystal layer parallel to the plates in the on-state; and that the liquid-crystal layer facing away from the polymer layer has a further polarizer which polarizes in its off-state parallel to the polymer layer.

15. Liquid-crystal display according to claim 1, wherein the polymer layer contains main chains, to which mesogenic side chains are coupled via flexible bridges by pairs of chemical functions capable of addition selected from the group consisting of

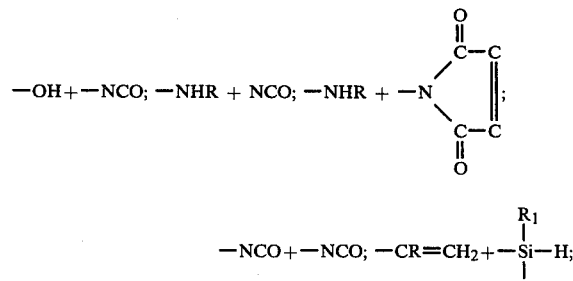

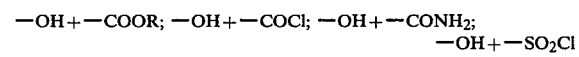

wherein R is selected from the group consisting of hydrogen and alkyl, and $R_1$ is alkyl.

16. Liquid-crystal display according to claim 1, wherein the polymer layer contains main chains which are coupled to mesogenic units via flexible bridges, by pairs of chemical functions capable of condensation selected from the group consisting of

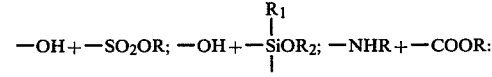

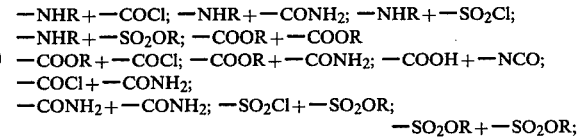

wherein R is selected from the group consisting of hydrogen and alkyl, and $R_1$ and $R_2$ each is alkyl.

17. Liquid-crystal display according to claim 1, characterized by the feature that the polymer layer consists of components of the type (-flexible bridge/mesogenic unit), where the bridges are polymerized with each other via chemical functions from the group:

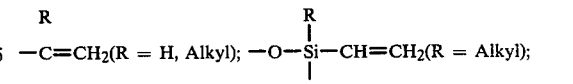

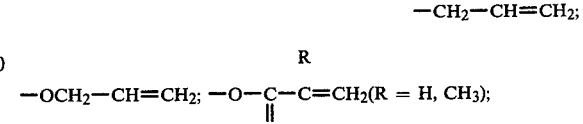

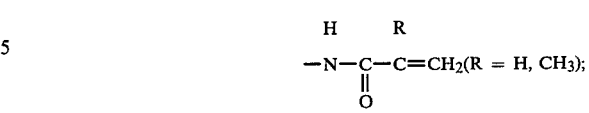

-continued

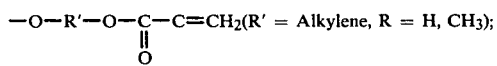

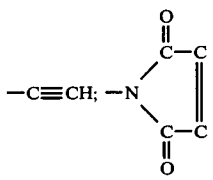

18. Liquid-crystal display according to claim 15, wherein the flexible bridges are members selected from the group consisting of alkylene and alkylene ether chains.

19. Liquid-crystal display according to claim 16, wherein the flexible bridges are members selected from the group consisting of alkylene and alkylene ether chains.

20. Liquid-crystal display according to claim 17, wherein the flexible bridges are members selected from the group consisting of alkylene and alkylene ether chains.

21. Liquid-crystal display according to claim 1 or claim 15 or claim 16 or claim 17, wherein the thicknesses of the polymer layer and other support plate layers are matched to each other in such a manner that the liquid-crystal display is optically coated internally.

* * * * *